United States Patent

[11] 3,616,040

| [72] | Inventor | Alex S. Toback |
| | | West Hartford, Conn. |
| [21] | Appl. No. | 752,506 |
| [22] | Filed | Aug. 14, 1968 |
| [45] | Patented | Oct. 26, 1971 |
| [73] | Assignee | Loctite Corporation |
| | | Newington, Conn. |

[54] PROCESS FOR BONDING WITH ACRYLATE POLYMERIZED BY A PEROXY AND A CONDENSATION PRODUCT OF ALDEHYDE AND A PRIMAR OR SECONDARY AMINE
12 Claims, No Drawings

[52] U.S. Cl. ................................................... 156/310,
156/293, 156/316, 156/331, 156/332, 161/190,
161/218, 161/219, 161/247, 161/248, 161/256,
161/257, 260/89.5 A, 260/885

[51] Int. Cl. ..................................................... B32b 7/10,
B32b 15/08, B32b 27/26

[50] Field of Search ........................................... 161/231,
233, 257, 256, 251, 218, 219, 190, 184, 247, 248;
156/310, 316–331, 332; 260/89.5, 885

[56] References Cited
UNITED STATES PATENTS

| 3,046,262 | 7/1962 | Krieble | 260/89.5 |
| 3,063,891 | 11/1962 | Boylan et al. | 156/310 |
| 3,136,681 | 6/1964 | Johnston | 161/184 X |
| 3,180,777 | 4/1965 | Karo | 156/310 |
| 3,203,941 | 8/1965 | Krieble | 260/89.5 |
| 3,259,534 | 7/1966 | Wieker et al. | 161/219 X |
| 3,425,988 | 2/1969 | Gorman et al. | 161/219 X |
| 3,435,012 | 3/1969 | Nordlander | 260/89.5 |
| 3,454,543 | 7/1969 | Rai et al. | 260/89.5 |

OTHER REFERENCES

College Organic Chemistry, E. Emmet Reid, D. Van Nostrand Co., N.Y. City, pgs. 259, 261, 1929.

Advanced Organic Chemistry, Fieser, L. F. and Fieser, Mavy, Reinhold Publishing Corp., N.Y. City 1961, page 506.

Organic Chemistry, Whitmore, F. C., 2nd Ed., D. Van Nostrand Co., N.Y. City, 1951 page 186.

*Primary Examiner*—John T. Goolkasian
*Assistant Examiner*—C. B. Cosby
*Attorneys*—J. Rodney Reck and William J. Daniel ABSTRACT: The speed of cure of a peroxy initiated acrylate based adhesive or sealant composition is markedly increased by treating one or more of the surfaces to be bonded with a bonding accelerator containing the condensation product of an aldehyde and a primary or secondary amine.

3,616,040

PROCESS FOR BONDING WITH ACRYLATE POLYMERIZED BY A PEROXY AND A CONDENSATION PRODUCT OF ALDEHYDE AND A PRIMAR OR SECONDARY AMINE

BACKGROUND OF THE INVENTION

It is well recognized that the adhesive bonding of surfaces has a number of inherent advantages over the more traditional mechanical methods of joining, such as by clamps, nuts and bolts, etc. As used herein, "adhesive bonding" refers not only to joining by strong adhesive bonds, but also to sealing or locking operations (such as "thread locking" of nuts and bolts) wherein adhesive bonds of relatively low strength are adequate. One of the most important reasons adhesives have not made more sizable inroads into industrial bonding applications is their lack of speed in curing, especially at room temperature. This is particularly true in manufacturing operations where it is not convenient to apply adhesives to parts and store them for long periods of time to allow the adhesives to cure in the conventional manner, especially when alignment is important and the parts must be maintained in a specific position or configuration until adequate curing of the adhesive has taken place.

One class of adhesives which, if the speed of cure were increased, could be adapted more readily to the solution of a wide variety of industrial problems is the class of polymerizable acrylate based adhesives. The polymerization (cure) of these adhesives can be initiated by certain free radical generators, most commonly peroxy-type polymerization initiators. Many types of desirable acrylate adhesives can be prepared because of the wide variety of viscosity and cure characteristics available in the acrylate monomers, and flexibility, tensile strength and heat resistance characteristics available in the cured products. A particularly useful class of acrylate adhesives is the "anaerobic" class of adhesives, i.e., those which are stabilized by the presence of oxygen but cure when placed in an oxygen free atmosphere, such as between metal or other nonporous surfaces.

In the prior art there are known a number of polymerization accelerators which can be used to increase the rate of cure of unsaturated monomers. However, a fully acceptable bonding accelerator has not been available for acrylate based adhesive compositions, particularly one which could provide adequate acceleration when applied as a "primer" or "surface activator" to one or both of the surfaces to be bonded (vis-a-vis mixed with the adhesive at the time of use in the conventional two-part adhesive fashion). The reasons are not fully clear; but in addition to lack of the native accelerating ability, most polymerization accelerators are not suitable bonding accelerators because they have either an adverse effect on the strength of the adhesive bonds which are formed, or because they are incompatible with the adhesive formulation. The compatibility consideration is particularly important when dealing with primers since little or no mixing is available under these conditions of use. Certainly there are other factors involved but, because of the complexity of the reactants and reaction mechanisms, they are not clearly understood at this time.

Another important factor to consider with regard to bonding accelerators is the nature of the surfaces to be bonded. Frequently a bonding accelerator which is quite active on one surface may be considerably less effective—or totally ineffective—on another. For example, it has been found that the effectiveness of a bonding accelerator on metal surfaces will vary considerably from one metal to another. Again, the contributing factors to this condition are not fully known. It is suspected that some surfaces tend to activate or deactivate certain classes of bonding accelerators or polymerization initiators.

An adhesive system capable of rapid bonding of parts would be a major improvement in the area of adhesive bonding. Further, a bonding process utilizing a bonding accelerator which is capable of markedly increasing the activity of surfaces for adhesive bonding, or of markedly increasing the rate of bonding of an acrylate based adhesive, would be a novel and useful process. In addition, a bonding process capable of producing bonds rapidly on all or nearly all surfaces, and particularly on all or nearly all metal surfaces, would be a novel and useful process.

THE INVENTION

This invention deals with a bonding system and process which utilizes a "primer" for activating surfaces for adhesive bonding. Specifically, the primers utilized in this invention contain a condensation reaction product of an aldehyde and a primary or secondary amine.

This invention also includes a multipart adhesive system which comprises: (A) as a polymerizable adhesive composition, a mixture of a polymerizable acrylate ester monomer and a peroxy polymerization initiator; and (B) as a bonding accelerator, a condensation reaction product of an aldehyde and a primary or secondary amine.

An additional aspect of this invention concerns the process for bonding solid surfaces which comprises: (A) applying to at least one of such surfaces an organic bonding accelerator containing a condensation reaction product of an aldehyde and a primary or secondary amine; (B) applying to at least one of such surfaces an adhesive composition comprising a mixture of a polymerizable acrylate ester monomer and a peroxy polymerization initiator; and (C) placing the surfaces so treated in abutting relation until the adhesive composition polymerizes and bonds the surfaces together.

DISCUSSION OF THE INVENTION AND ITS PREFERRED EMBODIMENTS

The bonding accelerators used in the invention disclosed herein have been found to increase remarkably the activity of surfaces for adhesive bonding and particularly for increasing the speed of cure of free radical initiated acrylate adhesive systems when used in bonding operations. The increase in speed of bonding provided by the system and process of the invention disclosed herein, and their applicability to a wide variety of surfaces, particularly metal surfaces, was quite surprising. Further the improvement in these respects over prior art systems and processes which utilize surface primers was totally unexpected.

The adhesives contemplated for use in the invention disclosed herein are adhesives of the acrylate ester type. Preferably, these acrylate adhesives are of the anaerobic type, i.e., acrylate monomers admixed with a peroxy polymerization initiator to form adhesives which remain stable in the presence of air (oxygen), but which when removed from the presence of air or oxygen will polymerize to form hard, durable resins. This type of adhesive is particularly adaptable to the bonding of metals and other nonporous or nonair-permeable materials since these materials effectively exclude air and oxygen from contact with the adhesive. Since these adhesives are stable for long periods of time but do not require the addition of an initiator at the time of intended use, they are exceptionally desirable products. In combination with the bonding accelerators disclosed herein as surface activators, an adhesive system is presented which offers the maximum of convenience and utility. No mixing is necessary to activate the adhesive, but exceptional speed is conveniently produced by use of the surface activator. Naturally, if the convenience of the single component anaerobic adhesives is not essential, any peroxy initiator can be mixed with the acrylate monomer at the time of use without deviating from the broad scope of this invention.

Of particular utility as adhesive materials are polymerizable di- and other polyacrylate esters since, because of their ability to form cross-linked polymers, they have more highly desirable adhesive properties. However, monoacrylate esters can be used, particularly if the nonacrylate portion of the ester contains a hydroxyl or amino group, or other reactive substituent which serves as a site for potential cross-linking. Examples of suitable monoacrylate ester monomers are furfuryl methacrylate, cyclohexyl acrylate, isobutyl methacrylate, hydroxyethyl methacrylate, cyanoethyl acrylate, t-butylaminoethyl methacrylate, dimethylaminoethyl methacrylate and glycidal methacrylate. Anaerobic properties (if such are desired) are imparted to the acrylate ester monomers by combining with them a peroxy polymerization initiator as discussed more fully below.

One of the most preferable groups of polyacrylate esters which can be used in the adhesives disclosed herein are polyacrylate esters which have the following general formula:

(1)
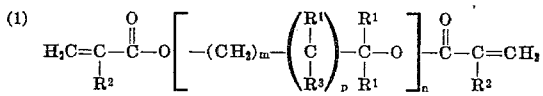

wherein $R^1$ represents a radical selected from the group of hydrogen, lower alkyl of from one to about four carbon atoms, hydroxy alkyl of from one to about four carbon atoms, and

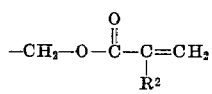

$R^2$ is a radical selected from the group consisting of hydrogen, halogen, and lower alkyl of from one to about four carbon atoms; $R^3$ is a radical selected from the group consisting of hydrogen, hydroxyl, and

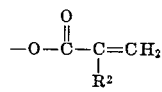

$m$ is an integer equal to at least 1, e.g., from 1 to about 15 or higher, and preferably from 1 to about 8 inclusive; $n$ is an integer equal to at least 1, e.g., 1 to about 20 or more; and $p$ is one of the following: 0, 1.

The polymerizable polyacrylate esters utilized in accordance with the invention and corresponding to the above general formula are exemplified by but not restricted to the following materials: di-, tri- and tetraethylene glycol dimethacrylate, dipropylene glycol dimethacrylate, polyethylene glycol dimethacrylate, di(pentamethylene glycol) dimethacrylate, tetraethylene glycol diacrylate, tetraethylene glycol di(chloroacrylate), diglycerol diacrylate, diglycerol tetramethacrylate, tetramethylene dimethacrylate, ethylene dimethacrylate, neopentyl glycol diacrylate and trimethylol propane triacrylate. The foregoing monomers need not be in the pure state, but may comprise commercial grades in which stabilizers such as hydroquinones and quinones are included.

A second class of preferred acrylate esters are those which are formed by the reaction of: (a) an acrylate ester containing an active hydrogen atom in the alcoholic portion of the ester; with (b) an organic isocyanate. Preferably, the active hydrogen is the hydrogen of a hydroxy or a primary or secondary amine substituent on the alcoholic portion of the ester, and the isocyanate is a di- or other polyisocyanate. Naturally, an excess of the acrylate ester should be used to insure that each isocyanate functional group in the polyisocyanate is substituted.

The most preferred of the acrylate esters used in the manner described above are those in which the acrylate ester is an alkyl or aryl acrylate ester, most preferably having the formula

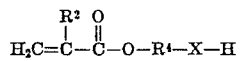

wherein X is selected from the group consisting of —O— and

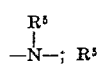

$R^5$ is selected from the group consisting of hydrogen and hydrocarbon groups containing up to about 10 carbon atoms, and preferably alkyl or aralkyl hydrocarbon groups of one through about four carbon atoms; $R^2$ is a defined above; and $R^4$ is a hydrocarbon group containing up to about eight carbon atoms, and preferably is a divalent organic radical selected from the group consisting of alkylene of one through about 10 carbon atoms, ether linked polyalkylene of one through 12 carbon atoms, and divalent aromatic radicals containing up to about 14 carbon atoms, preferably phenylene, biphenylene and naphthalene.

Typical polyisocyanates which can be reacted with the above acrylate esters to form polyacrylate monomers are toluene diisocyanate, 4,4'-diphenyl diisocyanate, dianisidine diisocyanate, 1,5-naphthalene diisocyanate, trimethylene diisocyanate, cyclohexylene diisocyanate, 2-chloropropane diisocyanate, 4,4'-diphenylmethane diisocyanate, 2,2'-diethyl-ether diisocyanate, 3(dimethylamino) pentane diisocyanate, tetrachlorophenylene diisocyanate-1,4, and trans-vinylene diisocyanate. Still other polyisocyanates that may be used are the higher molecular weight polyisocyanates obtained by reacting an excess of any of the above-described isocyanates with polyamines containing terminal, primary and secondary amine groups, or polyhydric alcohols, for example, the alkane and alkene polyols such as glycerol, 1,2,6-hexanetriol, 1,5-pentanediol, ethylene glycol, polyethylene glycol, bisphenol-A (4,4'-dihydroxydiphenyldimethylmethane), condensation products of alkylene oxides with bisphenol-A, and the like.

Other acceptable monomers which can be used in the adhesives disclosed herein are acrylate terminated epoxy or ester units, or low polymers thereof. Typical exemplary structures which have been prepared embodying these concepts are the following:

(2)
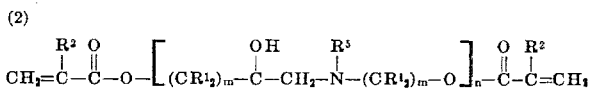

(3)
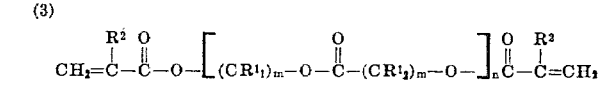

wherein $R^1$, $R^2$, $R^5 m$ and $n$ are as defined above.

Naturally any of the above-described acrylate and polyacrylate ester monomers can be used in combination if desired. Many of the higher molecular weight acrylate esters described above are extremely viscous and advantageously are mixed (diluted) with a low viscosity acrylate ester, such as an alkyl acrylate ester.

As used herein, the term "polymerizable acrylate ester monomer" includes not only the foregoing monomers in the pure and impure state, but also those other compositions which contain those monomers in amounts sufficient to impart to the compositions the polymerization characteristics of the acrylate esters. It is also within the scope of the present invention to obtain modified characteristics for the cured composition by the utilization of one or more monomers within the above formula with other unsaturated monomers, such as unsaturated hydrocarbons or unsaturated esters.

The most highly preferred of the peroxy initiators for use in combination with the polymerizable acrylate or polyacrylate esters described above are the organic hydroperoxy initiators, particularly those organic hydroperoxides having the formula $R^6OOH$, wherein $R^6$ is a hydrocarbon radical containing up to about 18 carbon atoms, preferably an alkyl, aryl, or aralkyl radical containing from one to about 12 carbon atoms. Typical examples of such hydroperoxides are cumene hydroperoxide, tertiary butyl hydroperoxide, methy ethyl ketone hydroperoxide, and hydroperoxides formed by the oxygenation of various hydrocarbons, such as methylbutene, cetane, and cyclohexene, and various ketones and ethers including certain of the compounds represented by general formula (1), above. The hydroperoxy initiators form exceptionally stable anaerobic adhesive systems. The combination of acrylate ester monomer and hydroperoxy initiator can be stored for many months without losing effectiveness as an adhesive. However, other peroxy initiators can be used, such as hydrogen peroxide, organic peroxides or organic peresters. Those peroxides and peresters which hydrolyze or decompose to form hydroperoxides frequently are highly useful in anaerobic systems; also Belgian Pat. No. 692,031 discloses that peroxides which have a half life of more than 5 hours at 100° C. are useful in somewhat related systems. If the peroxy initiator is added near the time of intended use (i.e., anaerobic characteristics are not necessary), substantially all peroxy initiators are useful and, generally, precautions against premature curing are not necessary.

The peroxy initiators which are used commonly comprise less than about 10 percent by weight of the combination of monomer and initiator since above that level they begin to effect adversely the strength of the adhesive bonds which are formed. Preferably the peroxy initiator comprises from about 0.1 percent to about 5 percent by weight of the combination.

Other materials can be added to the mixture of polymerizable acrylate ester monomer and peroxy initiator, such as quinone or polyhydric phenol stabilizers, tertiary amine or imide accelerators, and other functional materials, such as adhesive agents, thickeners, plasticizers, coloring agents, etc. These additives are used to obtain commercially desired characteristics, i.e., suitable viscosity and shelf stability for extended periods (preferably a minimum of 6 months). The presence of accelerators and stabilizers is particularly important when peroxy initiators other than organic hydroperoxides are used. For a complete discussion of the anaerobic systems and anaerobically curing compositions, reference is made to the following U.S. Pat. Nos. 2,895,950 to Vernon K. Krieble, issued July 21, 1959; 3,041,322 to Vernon K. Krieble, issued June 26, 1962; 3,043,820 to Robert H. Krieble, issued July 10, 1962; 3,046,262 to Vernon K. Krieble, issued July 24, 1962; 3,203,941 to Vernon K. Krieble, issued Aug. 31, 1965; 3,218,305 to Vernon K. Krieble, issued Nov. 16, 1965; and 3,300,547 to J. W. Gorman et al., issued Jan. 24, 1967.

The bonding accelerators disclosed herein for use with the above-described acrylate adhesives are the aldehyde-amine condensation products. These products are known accelerators in certain types of reactions and are sold primarily for use in the vulcanization of rubber. A description of these products can be found in the following U.S. Pat. Nos. 1,780,334 to Burnett et al., issued Nov. 4, 1930; 1,908,093 to Williams, issued May 9, 1933; and 2,578,690 to Gerhart, issued Dec. 18, 1951. To date, these materials have not been suggested for use as bonding accelerators.

The precise nature of the aldehyde-amine condensation products has never been determined with certainty. Various methods of chemical analysis clearly show the condensation product to be a complex mixture of a large number of compounds, and the bonding acceleration ability of this reaction product, for purposes of this invention, has not been traced to any specific member or members of the mixture. It is highly probable that the various components of the mixture contribute in varying degrees to the total effectiveness of the final product.

Substantial bonding acceleration ability will be obtained from the reaction product regardless of the ratio of aldehyde to amine which is used. However, the most significant bonding acceleration is obtained when the reaction mixture in which the condensation product is produced contains at least 1 mole of aldehyde for each mole of amine which is used. Preferably, the reaction mixture contains from about 1.0 to about 3.5 moles of aldehyde for each mole of amine which is used and most preferably from about 1.5 to about 3.0 moles of the aldehyde for each mole of the amine. While not necessary to achieve the results of this invention, it has been found that the presence of an acidic material in the condensation reaction mixture tends to accelerate the rate of production of the useful reaction product. Most preferably, the acids are weak organic acids, particularly carboxylic acids such as acetic acid, propionic acid, butyric acid and valeric acid. Low concentrations of inorganic acids, such as phosphoric and sulfuric acids, also can be used. Acetic acid has been found to be the most preferable of the carboxylic acids for the purposes disclosed herein. The speed of production of the suitable reaction product also can be accelerated by the use of appropriate amounts of heat, such as by the use of reaction temperatures of up to about 175° C., but preferably not greater than about 100° C.

The nature of the aldehydes used in the condensation products of the bonding accelerators disclosed herein have not been found to be critical. While some accelerating ability can be obtained by the use of aromatic aldehydes (such as benzaldehyde and naphthaldehyde), the aliphatic aldehydes have been found to be strongly preferable.

For example, aliphatic aldehydes such as formaldehyde, acetaldehyde, propionaldehyde, butyraldehyde, heptaldehyde, hexaldehyde, crotonaldehyde, cinnamic aldehyde, hydrocinnamic aldehyde and 2-phenylpropionaldehyde can be used effectively in preparing the condensation products disclosed herein. For general purposes, the applicable aldehydes can be represented by the formula $R^7CHO$ wherein $R^7$ is a hydrocarbon group containing up to about 12 carbon atoms, and preferably is an aliphatic hydrocarbon group containing up to about eight carbon atoms. Naturally, $R^7$ can contain any substituent or linkage, hydrocarbon or otherwise, which does not affect the condensation product adversely for the purposes disclosed herein.

Similarly, the nature of the primary or secondary amine is not critical for purposes of this invention, i.e., aliphatic or aromatic amines can be used. For example, primary aliphatic amines such as ethyl, n-butyl, n-propyl, isopropyl, n-hexyl and t-butyl amines conveniently can be used. Also primary aromatic amines, such as aniline, p-toluidine, o- or p-naphthalamine, xylidene, benzylamine or p-benzylaniline can be used. While the primary amines are preferred amines for use in preparing the condensation products disclosed herein, aliphatic or aromatic secondary amines also can be used. Typical examples of acceptable secondary amines are diethylamine, dipropylamine, diisopropylamine, diphenylamine, N-phenyl benzylamine and N-allylaniline. For general purposes, the applicable amines can be represented by the formula $R^8 R^9 NH$, wherein $R^8$ is a hydrocarbon radical containing up to about 14 carbon atoms, preferably an aliphatic or aromatic hydrocarbon group containing up to about eight carbon atoms, and $R^9$ is either hydrogen or $R^8$. Naturally, either $R^8$ or $R^9$ can contain any substituent or linkage, hydrocarbon or otherwise, which does not affect the condensation product adversely for the purpose disclosed herein.

Typical examples of aldehyde-amine condensation products which are useful in the invention disclosed herein are the following: formaldehyde-p-benzyl aniline; acetaldehyde-benzylamine; crotonaldehyde-butylamine; cinnamic aldehyde-aniline; cinnamic aldehyde-butylamine; 2-phenyl-propion-aldehyde-butylamine, butyraldehyde-butylamine; butyraldehyde-aniline; hydrocinnamaldehyde-butylamine; naphthaldehyde-o-toluidine; and heptaldehyde-N-allylaniline.

In order to obtain the maximum benefits of the bonding systems disclosed herein, it is important that the bonding accelerator composition be able to intimately contact the acrylate adhesive. While this can be accomplished in a number of ways, it has been found preferable to dissolve or disperse the bonding accelerator in a volatile solvent. The solution or dispersion of bonding accelerator in the solvent then can be applied to at least one of the surfaces to be bonded, and the solvent allowed to evaporate leaving a deposit of bonding accelerator on the surface or surfaces. Because of the extremely rapid cure speed, it is preferable to apply the bonding accelerator to each of the surfaces which are to be bonded. In this manner a more uniform polymerization pattern is produced, stresses in the bond are minimized, and stronger bonds are produced. The adhesive then can be applied directly to at least one of the surfaces to be bonded. If bonding accelerator has been applied to one surface, it is not material whether the adhesive and the bonding accelerator are applied to the same or different surfaces. The surfaces so treated then are placed or clamped together and the adhesive allowed to cure.

In choosing the solvent for dissolution or dispersion of the bonding accelerator, a solvent with a rapid rate of evaporation is desirable. This reduces the possibility of trapping solvent in the bonding accelerator-adhesive system during the bonding operation (which may tend to weaken the bond), and also avoids unnecessary delays to allow the solvent to evaporate before completing the bonding operation. While a large number of solvents are available for this purpose, the ones which have been found most useful are halogenated hydrocarbons, particularly chlorinated and/or fluorinated hydrocarbons, such as methylene chloride, trichloroethane, methylchloroform and trichloromonofluoromethane, and lacquer type solvents, such as acetone, methyl ethyl ketone, methyl isobutyl ketone, and ethyl acetate. Other acceptable solvents are xylene, benzene and toluene. Nearly all of these solvents, and particularly the halogenated hydrocarbons, produce a secondary benefit in that they can serve to clean the area of the surface which is to be bonded, thus reducing the chance of weak bond formation.

Frequently a small amount of a second, or "mutual," solvent can be added to the system in order to aid in solubilizing or dispersing the bonding accelerator. Since nearly all of the bonding accelerators disclosed herein are soluble in alcoholic-type solvents, such as ethyl alcohol, methyl alcohol, butyl alcohol and isopropyl alcohol, these have been found particularly adaptable to use as mutual solvents. Since many of these mutual solvents do not vaporize with the rapidity of the primary solvents, they should be used in as small an amount as possible, consistent with dissolving or dispersing the bonding accelerator. Preferably, the amount of mutual solvent should not exceed 15 percent by weight of the total amount of solvent in the system.

The amount of the bonding accelerator composition used in the solvent is limited only by its solubility characteristics in the solvent chosen. However, it is desirable to use a concentration which will produce optimum results during normal usage. If too little accelerator is applied, maximum speed of cure will not be achieved. If excessive accelerator is applied, the accelerator can form a barrier to effective contact between the adhesive and the surface to be bonded, thus reducing the ultimate strength of the bond which is formed. Based on the method of common usage of such products, it has been found preferable to use an accelerator concentration in the solvent of between about 0.1 percent and about 10 percent by weight, and preferably between about 0.2 percent and about 5.0 percent by weight.

The most highly preferred method of applying the bonding accelerator to the surface is from an aerosol container. In this manner a thin uniform film of the bonding accelerator is easily applied to the surface, and the maximum rate of solvent vaporization is achieved. Furthermore, more highly volatile solvents can be used under aerosol conditions than can be used conveniently in standard atmospheric pressure containers. Typical solvents within this category are dichlorodifluoromethane, vinyl chloride, and monochlorodifluoromethane. Upon release from the aerosol container, these solvents will evaporate exceedingly rapidly and thus shorten the time period between application of the bonding accelerator and completion of the bonding operation.

The amount of bonding accelerator to be applied to a given surface should be no more than necessary to obtain efficient acceleration of the bonding operation. Excess accelerator on one or more of the bonded surfaces can affect adversely the strength of the final bond. Further, when the amount of bonding accelerator exceeds about 5 percent by weight of the adhesive used, little if any additional increase in speed is noted. Generally, an amount of bonding accelerator equal to from about 0.05 to about 1.0 percent by weight of the adhesive is adequate. While it is not easy to determine the amount of accelerator applied to a given surface, adequate results are obtained with the single application by aerosol or otherwise of a thin film of the accelerator dissolved or dispersed in an appropriate solvent to the surfaces to be bonded.

When the bonding accelerator has been applied to the surface and the solvent, if any, has been allowed to evaporate, the bonding operation can proceed in the normal manner. The adhesive can be applied either to the surface which has been treated with the bonding accelerator or to the appropriate mating surface. Customarily, as with most bonding operations, a thin film of adhesive is most desirable, The two mating surfaces are then placed in abutting relationship, and, preferably, a moderate compressive force is applied to produce a relatively thin layer of adhesive between the two surfaces, spread the adhesive evenly between the surfaces, and thus maximize the bonding efficiency. Typically a thickness of adhesive between the surfaces of from about 0.001 inch to about 0.005 inch is desirable. Such thicknesses generally can be achieved with the adhesives disclosed herein by the application of a moderate compressive force, such as of from about 5 to about 50 pounds per square inch.

EXAMPLES

The following examples are given to demonstrate typical products and processes within the scope of the invention disclosed herein, and are not intended to be limitations upon the invention. Unless stated to the contrary, all ratios and percentages in the examples are on a weight basis.

EXAMPLE I

A polymerizable acrylate sealant was prepared by mixing 98 percent by weight polyetheleneglycol dimethacrylate (average molecular weight = 330) with approximately 2 percent by weight cumene hydroperoxide. This sealant then was used to test various bonding accelerators of the type disclosed herein.

A series of four bonding accelerator solutions were prepared by dissolving in benzene 6 percent by weight of an aldelydeamine condensation product. The specific condensation products are listed below in table I. A small amount of each of these bonding accelerators then was applied to a series of standard ⅜-inch steel bolts by dipping the bolt into a beaker of the bonding accelerator. Thereafter, about 30 seconds were allowed to permit the benzene to evaporate and leave the bonding accelerator deposited upon the bolt.

Several drops of the polymerizable acrylate sealant, prepared as described above, then were applied to the threaded portion of the bolt and the bolt immediately was assembled with a mating nut, leaving about three threads exposed below the nut. The nut then was moved slightly every few seconds and the time recorded when such movement was not possible by hand. This time is defined as "fixture time."

The results produced in the above described tests are recorded in table I below. The butyraldehyde-aniline condensation product was that sold by the Du Pont Company under the name "808." The butyraldehyde-butylamine condensation product was that sold by the Du Pont Company under the name "833." The hydrocinnamic aldehyde-butylamine condensation product was prepared by reacting a 1-to-1 mole ratio of the aldehyde and amine for 3 hours at 50° C. in a methylene chloride solvent. All figures for fixture time expressed in table I are the average of three tests.

TABLE I

| Condensation Product | Fixture Time |
|---|---|
| Control (No Condensation Product) | >6 hours |
| Butyraldehyde-aniline | 25 minutes |
| Butyraldehyde-butylamine | 18 minutes |
| Hydrocinnamic aldehyde-butylamine | 20 minutes |

EXAMPLE II

The tests of example I were repeated using the identical materials and amounts thereof, except that B-hydroxypropyl methacrylate was substituted for the polyetheleneglycol dimethacrylate in preparing the polymerizable acrylate sealant. The results of the tests are presented below in table 2, each fixture time being an average of three tests.

TABLE II

| Condensation Product | Fixture Time |
| --- | --- |
| Control (No Condensation Product) | 20 hours |
| Butyraldehyde-aniline | 25 minutes |
| Butyraldehyde-butylamine | 20 minutes |
| Hydrocinnamic aldehyde-butylamine | 20 minutes |

EXAMPLE III

A polymerizable acrylate adhesive formulation was prepared by mixing the following ingredients in the approximate proportion indicated.

| Component | Approximate Weight Percent |
| --- | --- |
| Adhesive Monomer 1(a) | 36 |
| Adhesive Monomer 2(b) | 6 |
| Hydroxypropyl methacrylate | 48 |
| Adhesive Agent | 7 |
| Cumene Hydroperoxide | 3 |
| Quinone | 100 parts per million by weight |
| Total | 100 |

(a)

Reaction product of 2 moles B-hydroxypropyl methacrylate with 1 mole of the reaction product of 1 mole of hydrogenated "Bisphenol-A" (4,4'

-dicyclohexanol dimethylmethane) and 2 moles of toluene diisocyanate.

(b)

Reaction product of 3 moles of hydroxyethyl methacrylate with 1 mole of the reaction product of polypropylenetriol (average molecular weight = 2,500

) and 3 moles of toluene diisocyanate.

The adhesive so prepared was used to bond a series of 1-inch by 5-inch by 1/16-inch steel lap strips, using the bonding accelerators of example I to increase the speed of cure of the adhesive. The bonding accelerator was applied with a cotton swab to at least one-inch of the flat surface at the end of each of two lap strips. A thin coating of the adhesive then was applied to one of the treated surfaces, and the treated surface of the second lap strip immediately was placed on top of the adhesive. The lap strips were positioned in an aligned relationship and the overlap of the two strips was adjusted one inch. Pressure was applied perpendicular to the treated surfaces to reduce the bond line to approximately 0.001 to 0.003 inch. In view of the extreme accelerating ability of the bonding accelerators of this invention, the above operations were performed as rapidly as possible.

To measure the accelerating ability of the various bonding accelerators used, the "fixture time" was determined. "Fixture time" is the earliest time at which the bonded assembly can be held at one end and gently shaken without producing relative movement between the two lap strips. In addition, the "2-minute shear strength" of the bond was determined, i.e., the shear force (pounds per square inch) necessary to separate the lap strips approximately 2 minutes after application of the adhesive. The determination was made on a standard laboratory tensile tester (Research Products Co, Model RPC). The results of the above tests are presented below in table III.

TABLE III

| Condensation product | Fixture time | 2-minute shear strength, p.s.i. |
| --- | --- | --- |
| Control (no condensation product) | 6 hours | 0 |
| Butyraldehyde: | | |
| Aniline | 15 seconds | 1,380 |
| Butylamine | 10 seconds | 2,260 |
| Hydrocinnamic aldehyde-butylamine | 30 seconds | 1,620 |

When in the above example, any of the condensation products is replaced in whole or in part by any of the following aldehyde-amine condensation products: formaldehyde-p-benzyl aniline; acetaldehyde-benzylamine; crotonaldehyde-butylamine; cinnamic aldehyde-aniline; cinnamic aldehyde-butylamine; 2-phenylpropionaldehyde-butylamine; or heptaldehyde-N-allyl aniline; substantially similar results are obtained in that rapid bonding of the metal strips is produced.

I claim:

1. A process for bonding surfaces which comprises: (A) applying to at least one of such surfaces a bonding accelerator containing a condensation reaction product of an aldehyde and a primary or secondary amine; (B) applying to at least one of such surfaces an adhesive composition comprising a mixture of a polymerizable acrylate ester monomer and a peroxy polymerization initiator for said monomer; and (C) placing the surfaces so treated in abutting relation until the adhesive composition polymerizes and bonds the surfaces together.

2. The process of claim 1 wherein the condensation reaction product is the condensation reaction product of (i) an aldehyde having the formula RCHO wherein R is a hydrocarbon group containing up to about 12 carbon atoms, and (ii) an amine having the formula R'R''NH wherein R' is a hydrocarbon group containing up to about 14 carbon atoms and R'' is hydrogen or R'.

3. The process of claim 2 wherein the aldehyde is an aliphatic aldehyde, and R'' is hydrogen.

4. The process of claim 2 wherein R is a hydrocarbon group containing up to about eight carbon atoms, R' is a hydrocarbon group containing up to about eight carbon atoms, and R'' is hydrogen or R'.

5. The process of claim 1 wherein the polymerizable acrylate ester monomer is the reaction product of (i) an acrylate ester having an active hydrogen in the alcoholic portion thereof and (ii) a polyisocyanate.

6. The process of claim 1 wherein the peroxy polymerization initiator is a hydroperoxy polymerization initiator.

7. The process of claim 1 wherein the polymerizable acrylate ester monomer is a polyethyleneglycol dimethacrylate, and the peroxy polymerization initiator is an organic hydroperoxide.

8. The process of claim 1 wherein the bonding accelerator is dissolved in a volatile organic solvent.

9. The process of claim 1 wherein the bonding accelerator and volatile organic solvent are applied from an aerosol container.

10. The process of claim 1 wherein the polymerizable acrylate ester is the reaction product of (i) an acrylate ester having an active hydrogen in the alcoholic portion of the ester and (ii) an organic polyisocyanate, and the polymerization initiator is an organic hydroperoxide.

11. The process of claim 11 wherein the acrylate ester contains a hydroxy or a primary or secondary amine substituent on the alcoholic portion of the ester.

12. The process of claim 1 wherein the polymerizable acrylate ester monomer has the formula

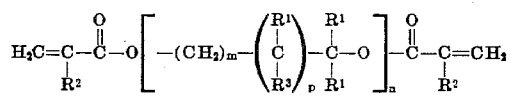

wherein $R^1$ represents a radical selected from the group of hydrogen, lower alkyl of from one to about four carbon atoms, hydroxy alkyl of from one to about four carbon atoms, and $R^2$ is a radical selected from the group consisting of hydrogen, halogen, and lower alkyl of from one to about four carbon atoms; $R^3$ is a radical selected from the group consisting of hydrogen, hydroxyl, and

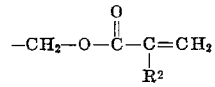

$m$ is an integer equal to at least 1; $n$ is an integer equal to at least 1; and $p$ is one of the following: 0,1.

UNITED STATES PATENT OFFICE
CERTIFICATE OF CORRECTION

Patent No. 3,616,040  Dated October 26, 1971

Inventor(s) Alex S. Toback

It is certified that error appears in the above-identified patent and that said Letters Patent are hereby corrected as shown below:

Claim 11, line 1; Delete the numeral "11" and substitute --10--.
Claim 12 should read as follows:
  The process of claim 1 wherein the polymerizable acrylate ester monomer has the formula

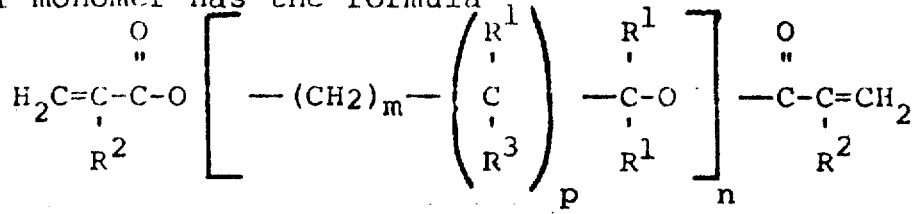

wherein $R^1$ represents a radical selected from the group of hydrogen, lower alkyl of from one to about four carbon atoms, hydroxy alkyl of from one to about four carbon atoms, and

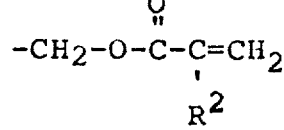

$R^2$ is a radical selected from the group consisting of hydrogen, halogen, and lower alkyl of from one to about four carbon atoms; $R^3$ is a radical selected from the group consisting of hydrogen, hydroxyl, and

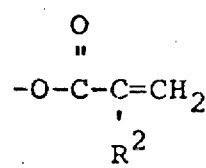

m is an integer equal to at least 1; n is an integer equal to at least 1; and p is one of the following: 0,1.

Signed and sealed this 17th day of September 1974.

(SEAL)
Attest:

McCOY M. GIBSON JR.          C. MARSHALL DANN
Attesting Officer            Commissioner of Patents